United States Patent [19]

Hicks et al.

[11] 4,237,106

[45] Dec. 2, 1980

[54] PRODUCTION OF SOLID AMMONIUM POLYPHOSPHATE BY CONTROLLED COOLING

[75] Inventors: Gordon C. Hicks, Sheffield; George H. Megar, Florence, both of Ala.

[73] Assignee: Tennessee Valley Authority, Muscle Shoals, Ala.

[21] Appl. No.: 675,586

[22] Filed: Apr. 9, 1976

Related U.S. Application Data

[63] Continuation of Ser. No. 629,281, Nov. 6, 1975, now Defensive Publication No. T950,011.

[51] Int. Cl.$^3$ .................. C01B 15/16; C01B 25/26
[52] U.S. Cl. .................... 423/315; 423/305; 71/43
[58] Field of Search ............ 423/305, 314, 315, 310, 423/313; 71/43

[56] References Cited

U.S. PATENT DOCUMENTS

| | | | |
|---|---|---|---|
| 3,420,638 | 1/1969 | Cutter et al. | 423/319 X |
| 3,537,814 | 11/1970 | Farr et al. | 71/43 |
| 3,649,175 | 2/1972 | Legal | 423/305 |
| 3,733,191 | 5/1973 | Meline et al. | 71/43 X |
| 3,985,538 | 10/1976 | Hicks et al. | 423/310 X |

FOREIGN PATENT DOCUMENTS 1536362  8/1968  France .................... 423/305

*Primary Examiner*—O. R. Vertiz
*Assistant Examiner*—Gregory A. Heller
*Attorney, Agent, or Firm*—Robert A. Petrusek

[57] ABSTRACT

Process for the production of solid ammonium polyphosphate in which ammonium phosphate melt is prepared in a pipe reactor and is solidified by controlled cooling to form crystals of a size and in quantity suitable to yield a hard, nontacky, and friable solid. Wet-process phosphoric acid is ammoniated in a pipe reactor to an $NH_3:H_3PO_4$ mole ratio of about 1.0, and the resulting melt is agitated and simultaneously partially cooled by application of recycled pulverized product or air or a water jacket. The partially cooled melt is then solidified continuously into nontacky sheets on a water-cooled metal surface using warm water to slowly remove sensible heat and heat of crystallization. Up to about 55 percent or higher of the $P_2O_5$ in the product may be polyphosphate. Without controlled cooling, a supersaturated solution or a microcrystalline texture results and the product is rather like a gel.

2 Claims, 1 Drawing Figure

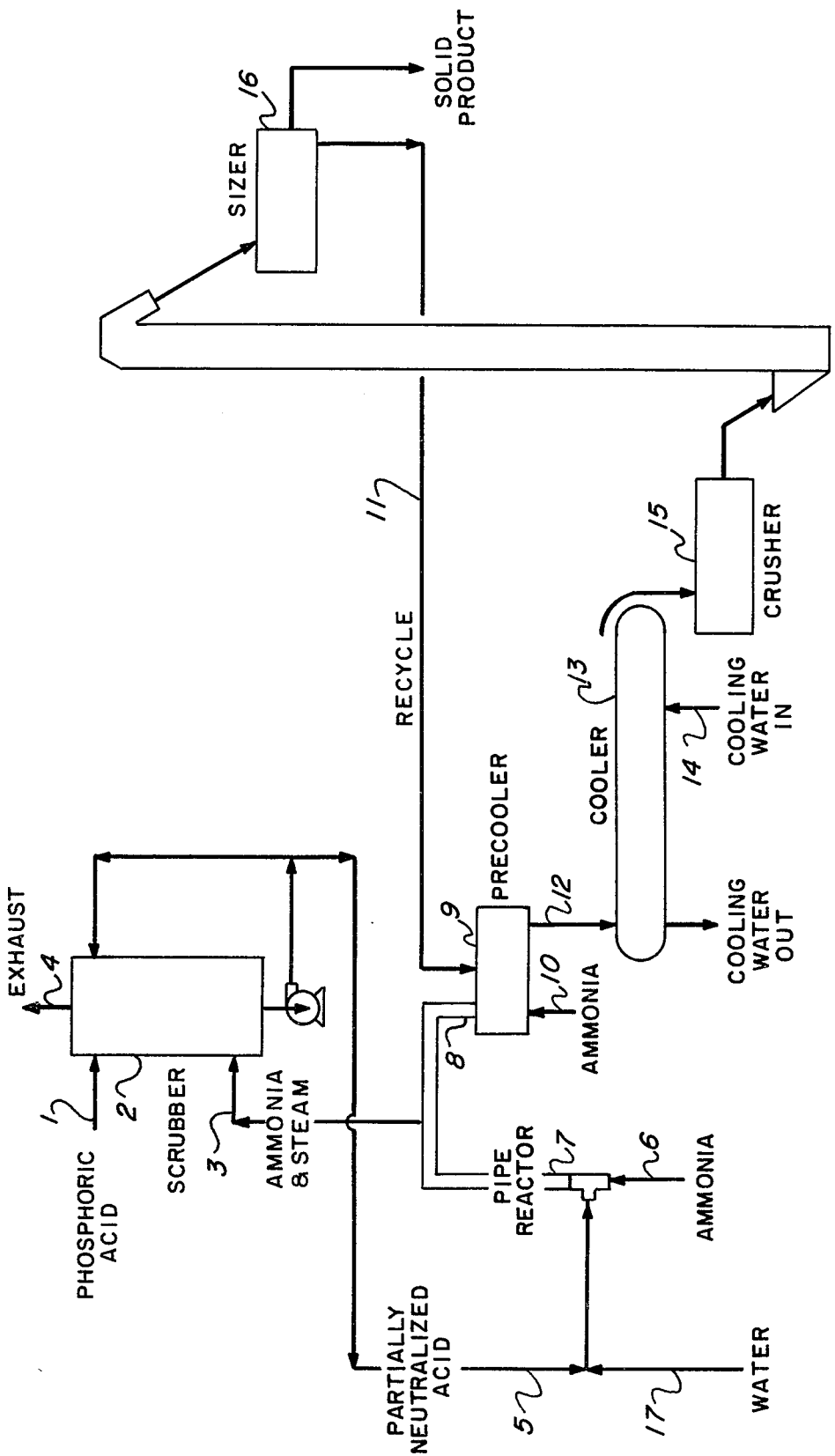
FLOWSHEET OF SOLIDIFICATION PROCESS FOR AMMONIUM POLYPHOSPHATE

PRODUCTION OF SOLID AMMONIUM POLYPHOSPHATE BY CONTROLLED COOLING

This application is a continuation of copending application Ser. No. 629,281, filed Nov. 6, 1975, for PRODUCTION OF SOLID AMMONIUM POLYPHOSPHATE BY CONTROLLED COOLING now Defensive Publication No. T 950,011, published Sept. 7, 1976.

This invention relates to an improved method for the manufacture of solid ammonium phosphate; more particularly it relates to a method of solidifying by cooling a melt of ammonium phosphate; still more particularly, it relates to solidification of said melt by controlled cooling; and even still more particularly, it relates to solidification of ammonium polyphosphate melt, which is produced in a pipe reactor, by precooling melt in a fluid mixer prior to slow cooling on a water-cooled metal surface to form proper crystal sizes and quantities to immobilize any gel phase wherein the tacky, amorphous gel previously formed is eliminated.

Beginning in 1966 and continuing until 1975 and later, the assignee has produced a granular ammonium polyphosphate made from electric furnace superphosphoric acid and anhydrous ammonia by a procedure found in U.S. Pat. Nos. 3,228,752 and 3,264,085 by Hignett and Getsinger.

The product, which has at least 50 percent of the $P_2O_5$ as polyphosphate, has found wide use as an intermediate in the production of high-analysis liquid fertilizers of very good quality. The desire to produce a similar product from wet-process phosphoric acid instead of the more costly electric furnace phosphoric acid has resulted in several years of research and development work.

In U.S. Pat. No. 3,733,191, Meline et al, and in U.S. Pat. No. 3,382,059, Getsinger (assigned to the assignee of the present invention) there are shown improved processes for the production of ammonium polyphosphate in molten anhydrous form from wet-process phosphoric acid and anhydrous ammonia. In Meline's process, the ammonium polyphosphate melts oftentimes contain as much as or greater than 50 percent of the $P_2O_5$ in the polyphosphate form. However, in Meline's work it was discovered that the granulation characteristics of the melt are less than desirable unless the polyphosphate content of same is held to a maximum of 25 to 30 percent. Meline also found a most unexpected advantage in his procedure was the high degree of $P_2O_5$ water solubility in the products. When similar products are produced from wet-process phosphoric acid by established processes, such as are used in producing diammonium phosphate, the water solubility of the $P_2O_5$ will be, at the most, 95 percent of the total. In all products produced by Meline's invention, the water solubility of the $P_2O_5$ was 98 percent of the total or more. This high water solubility enhances the use of the product as an intermediate for making liquid fertilizer. It is very much desirable for making liquid fertilizer that at least 50 percent or more of the $P_2O_5$ be in the polyphosphate form. Thus, the limit of 25 to 30 percent of the $P_2O_5$ as polyphosphate to enhance granulation in Meline's granulation procedure resulted in the continued research that eventually led to the instant invention.

We have found that the present invention can be effected by the use of controlled cooling of the ammonium polyphosphate melts which results in the formation of a rigid crystalline matrix which immobilizes the amorphous phase formed by the polyphosphate gel. This immobilization of the gel allows production of solid ammonium polyphosphate containing in excess of 30 percent of the $P_2O_5$ in the polyphosphate form which heretofore was the upper practical limit in Meline's process of solidification by granulation. The solid product of the present invention is not sticky or semiplastic as is the case of ammonium polyphosphate made by other means and from wet-process acid. Products with 50 percent or more of the $P_2O_5$ is the polyphosphate form and in hard, nonsticky particles can be made by the use of controlled cooling of the melt.

Further advantages of the present invention will appear from the more detailed description set forth below, it being understood, however, that this more detailed description is given by way of illustration and explanation only and not necessarily by way of limitation since various changes therein may be made by those skilled in the art without departing from the true spirit and scope of the present invention, and which novelty thereof resides in the use of controlled, slow cooling to form ammonium phosphate crystals large enough and of sufficient quantity to immobilize any gel phase wherein the tacky, amorphous gel previously formed is eliminated.

Our invention, together with further objects and advantages thereof will be better understood from a consideration of the following description taken in connection with the accompanying drawing in which:

The FIGURE illustrates in flowsheet form our new and novel process of controlled cooling of ammonium phosphate melt (resulting from reacting wet-process phosphoric acid and ammonia) to yield hard, solid, nontacky material instead of amorphous gel.

Referring now to the FIGURE, from a soure not shown a stream of phosphoric acid via line 1 is introduced into scrubber vessel 2 where any unreacted ammonia from pipe reactor 7 via line 3 is recovered by the partial neutralization of wet-process phosphoric acid. Steam from pipe reactor 7 is bled to scrubber 2 via line 3 and it, together with water vapor resulting from the evaporation of part of the water in the acid in scrubber vessel 2, passes via line 4 to the atmosphere. Simultaneously and continuously, a stream of partially neutralized wet-process phosphoric acid removed from scrubber vessel 2 via line 5 and a stream of anhydrous vapor of ammonia via line 6 are introduced into pipe reactor 7 where they, along with a relatively small stream of water from line 17, are reacted at about atmospheric pressure to give a temperature of 500°–600° F. The resulting ammonium phosphate melt is removed from pipe 7 via line 8 and is discharged into an agitated precooler 9, which can be a paddle mixer, water-jacketed mixer, or similar unit for agitating and removing heat from the melt. As shown, additional ammonia is added via line 10, and recycled finely divided product is introduced via line 11 into precooler 9. The partially cooled ammonium polyphosphate melt is withdrawn from precooler 9 via line 12 at 300°–350° F. and discharged into cooler 13 where heat is slowly removed by water stream 14 which enters separate chambers of the cooler at temperatures as low as 50° F. and as high as 180° F. so as to give optimum cooling for proper crystal growth, thus solidifying the melt into hard sheets of ammonium polyphosphate. The sheet is finely divided in crusher 15 and then introduced into size classifier 16. With feed acids of lower $P_2O_5$ content, less water is added to pipe reactor 7 via line 17 to control polyphosphate content of the melt.

Phosphoric acid of low conversion to the polyphosphate form (54 to 72 percent $P_2O_5$ with 5 to 30 percent as polyphosphate, usually about 68 to 70 percent $P_2O_5$) and of either the wet-process type or the electric furnace type may be used in our process to form the ammonium phosphate melt when reacted with anhydrous ammonia vapor. The ammoniation is carried out continuously by simultaneously introducing the reactants into a length of pipe of suitably corrosion-resistant material preceded by a standard pipe tee. The ammonium polyphosphate melt is formed in the pipe reactor and the water vapor formed by the heat of reaction is vented upward through a branch pipeline. The ammonium polyphosphate melt is discharged into a precooling vessel wherein the temperature is decreased by addition of recycled, finely divided particles which are at least partially melted in the process of cooling the fresh melt from a very fluid liquid to a consistency that is barely fluid. The cooled melt is then introduced onto the second cooler where warm water is used to indirectly cool the melt to a temperature at which it solidifies.

In order that those skilled in the art may better understand how the present invention can be practiced, the following examples are given by way of illustration and not necessarily by way of limitation.

EXAMPLE I

In past research, on producing a solid ammonium polyphosphate from wet-process phosphoric acid, we found that the removal of the heat in the melt, both that in the form of sensible heat and that in the form of heat of crystallization, is necessary to result in solidification.

In said prior research, the melt had been cooled in a granulator by the use of cooled particles of product recycled from the last stage of the process back to the granulator. Because of the granules thus formed being of a somewhat plastic or sticky consistency when wet-process acid was used, and the polyphosphate content exceeded only about 30 percent of the total $P_2O_5$, we tested a different means of cooling the melt using an endless belt of flexible metal that travels over and in direct contact with cooling water, said cooling belt being of the common type used for solidifying melts of fertilizer materials other than ammonium polyphosphate and known by those skilled in the art. Data from an early test of solidifying the ammonium polyphosphate melt on a water-cooled belt are given in Table I as run 11A. To obtain maximum cooling, we used cooling water at a temperature of about 60° F. to remove the heat from the melt. In this test, we had to limit the polyphosphate content of the product to about 27 percent of the total to produce a solid that was nonsticky and firm enough to be flaked from the belt.

EXAMPLE II

When the temperature of the cooling water was increased to 130° F. as shown for run 13D, the solid product was in satisfactory conditions with the polyphosphate content as high as about 30 percent of the total $P_2O_5$.

EXAMPLE III

In still later runs, after the installation of a small pugmill in which recycled fine particles of solid product were mixed with the fresh melt, thus lowering the temperature of the melt to 350° F., the temperature of the cooling water was decreased to about 70° F. as shown in run 18C in Table I. The mechanical working of melt in the pugmill also aided in crystallization of the melt. With these conditions, the solid product was in satisfactory condition when the polyphosphate was as high as about 44 percent of the total $P_2O_5$.

EXAMPLE IV

By using precooling and working of the melt by mixing it with recycle and by using cooling water for the belt at a temperature of about 145° F., a satisfactory solid product was made as shown in run 30A with a polyphosphate content as high as 53 percent of the total $P_2O_5$.

Table I

| Production of Solid Ammonium Polyphosphate | | | | |
|---|---|---|---|---|
| Run No. | 11A | 13D | 18C | 30A |
| Feed acid | | | | |
| Rate, lb/hr | 260 | 218 | 295 | 264 |
| Total $P_2O_5$, % | 68 | 67 | 68 | 69 |
| Ammonium polyphosphate melt | | | | |
| Temperature in reactor | 415 | 445 | 530 | 560 |
| Chemical analysis, % | | | | |
| Total N | 11.5 | 11.5 | 11.9 | 11.5 |
| Total $P_2O_5$ | 58.4 | 59.3 | 60.5 | 61.3 |
| Polyphosphate $P_2O_5$, | | | | |
| % of total $P_2O_5$ | 17.6 | 26.8 | 58.8 | 64.1 |
| $NH_3:H_3PO_4$ mole ratio | 1.00 | 0.98 | 1.00 | 0.95 |
| First-stage cooler conditions | | | | |
| Fresh melt rate, lb/hr | 304 | 248 | 338 | 304 |
| Recycled fines rate, lb/hr | — | — | 175 | 240 |
| Temperature, °F. | | | | |
| Melt in | — | — | 482 | 500 |
| Melt out | — | — | 350 | 295 |
| Second-stage cooler conditions | | | | |
| Belt speed, ft/min | 1.8 | 1.8 | 2.5 | 1.8 |
| Cooling water temperature, °F. | 63 | 130 | 70 | 145 |
| Solid product analysis, % | | | | |
| Total N | 11.5 | 11.6 | 11.6 | 11.7 |
| Total $P_2O_5$ | 58.9 | 59.3 | 59.5 | 59.9 |
| Polyphosphate, $P_2O_5$, | | | | |
| % of total $P_2O_5$ | 26.6 | 29.8 | 43.5 | 53.4 |
| $NH_3:H_3PO_4$ mole ratio | 0.99 | 0.99 | 0.99 | 0.99 |

While we have shown and described particular embodiments of our invention, modifications and variations thereof will occur to those skilled in the art. We wish it to be understood, therefore, that the appended claims are intended to cover such modifications and variations which are within the true scope and spirit of our invention.

We claim:

1. An improved process for the solidification of ammonium polyphosphate melts high in nonortho species into strong, nontacky particles of ammonium polyphosphate eminently suitable for fertilizer material, which comprises introducing wet-process phosphoric acid containing 54 to 72 percent by weight $P_2O_5$ into inline reactor means, said inline reactor means comprising a common pipe-type reactor; simultaneously introducing a stream of ammonia into said inline reactor means in quantities sufficient to maintain therein a mole ratio of $NH_3:H_3PO_4$ in the range from about 0.8 to 1.0; simultaneously introducing a stream of water into said inline reactor means in quantities sufficient to maintain a reaction temperature of about 500° to about 600° F.; contacting said wet-process acid with said streams of ammonia and water in said common pipe reactor at about atmospheric pressure and forming at temperatures in the range of about 500° to about 600° F. in said inline reactor means a resulting melt of ammonium polyphosphate containing upwards to about 60 percent of the $P_2O_5$ values therein as polyphosphate; exhausting water vapor formed by heat of said ammoniation reaction in said inline reactor means and excess ammonia vapor into means for recovery of said ammonia vapor; introducing said melt into a first-stage pugmill cooler open to ambient atmospheric pressure, in which the melt is worked mechanically and the temperature of said melt is decreased to a range of about 300° to about 350° F. by simultaneously introducing either a stream of air or a stream of particles of recycled fines from a later-mentioned crushing step, or both; simultaneously introducing a second stream of ammonia into said cooler to increase the $NH_3:H_3PO_4$ mole ratio of said ammonium polyphosphate melt to about 1.0 to 1.2; withdrawing the resulting cooled melt from the end of said cooler; introducing said withdrawn melt onto second-stage cooler means, said second-stage cooler means open to ambient atmospheric pressure and comprising an endless metal belt, the surface of which is cooled with streams of water maintained at various temperatures from about 50° to about 180° F.; withdrawing solidified ammonium polyphosphate material from the end of said second-stage cooler means; introducing said withdrawn material into a common crusher; withdrawing crushed material from said crusher; introducing said crushed material into sizing means; returning particles of predetermined size from said sizing means into said first-stage cooler means and withdrawing from said sizing means particles of ammonium polyphosphate as product, said process characterized by the fact that the crystalline material is formed in sufficiently large crystal size and quantity to solidify any amorphous matter in the product withdrawn from said second-stage cooler, and said product withdrawn from said second-stage cooler containing in the range from about 30 to about 55 percent of its total $P_2O_5$ content as polyphosphate.

2. The process of claim 1 wherein said ammonium polyphosphate melt is cooled at controlled conditions in one of the cooling stages by the use of a countercurrent flow of water in said second-stage cooler means comprising said endless metal belt, said flow of water proportioned to said melt to effect water temperatures up to about 180° F. juxtaposed the region said melt initially contacts said second-stage cooler.

* * * * *